United States Patent [19]

Grantland

[11] Patent Number: 4,821,313
[45] Date of Patent: Apr. 11, 1989

[54] PAYSTATION TRANSMITTER GROUND DETECT CIRCUITRY

[75] Inventor: Gary Grantland, Hartselle, Ala.

[73] Assignee: Palco Telecom Inc., Nashville, Tenn.

[21] Appl. No.: 214,430

[22] Filed: Jul. 1, 1988

[51] Int. Cl.$^4$ .................................... H04M 17/00
[52] U.S. Cl. .................................... 379/145; 379/155
[58] Field of Search ............ 379/145, 146, 123, 132, 379/155

[56] References Cited

U.S. PATENT DOCUMENTS

| | | | |
|---|---|---|---|
| 2,084,121 | 6/1937 | Anderson et al. | 379/145 |
| 2,684,997 | 7/1954 | Thompson | 379/145 |
| 2,765,366 | 10/1956 | Holden | 379/145 |
| 3,794,783 | 2/1974 | Radu | 379/145 |
| 3,863,036 | 1/1975 | McCrudden | 379/146 |
| 3,890,468 | 6/1975 | Burns et al. | 379/146 |
| 4,124,774 | 11/1978 | Zarouni | 379/146 |
| 4,136,262 | 1/1979 | Clark, Jr. | 379/146 |
| 4,429,183 | 1/1984 | Nemecseil et al. | 379/145 |
| 4,567,325 | 1/1986 | Crouch et al. | 379/145 |
| 4,625,078 | 11/1986 | Crouch et al. | 379/145 |
| 4,759,054 | 7/1988 | Mellon | 379/145 |

Primary Examiner—Robert Lev
Attorney, Agent, or Firm—Robert J. Black

[57] ABSTRACT

A ground detect circuit for use in telephone paystation consisting of a comparator circuit which compares the voltage across a telephone transmitter included in the paystation to prevent users from fraudulent use of the instrument by grounding the handset transmitter to signal the central office that initial rate deposit has been made when in fact it has not. The ground detect circuit upon detecting the presence of ground at the transmitter generates a signal which can be utilized to disable an associated calling device.

5 Claims, 1 Drawing Sheet

PAYSTATION TRANSMITTER GROUND DETECT CIRCUITRY

BACKGROUND OF THE INVENTION

1. Field of the Invention

The present invention relates to telephone paystations and more particularly to a transmitter ground detect circuitry to prevent users from fraudulent use of the paystation instrument by grounding the transmitter.

2. Description of the Related Art

Telephone paystations are frequently designed to work in the emergency prepay mode. That is to say they do not require a coin to be deposited to enable the dial or associated telephone keypad (utilized where tone signaling is incorporated in the paystation). This arrangement is provided so that telephone users may call emergency numbers (911, etc.) without making the necessary coin deposits. Should the user dial a number other than an emergency number as designated by the telephone central office, the central office will perform a coin test to determine if the initial rate or amount of coins required have been properly deposited.

This coin test looks for the presence of ground current or a difference in current through the two loop conductors extending between the telephone central office and the paystation. When the initial rate (10 cents, 15 cents, 25 cents, etc.) has been deposited, the paystation then connects a load, in most instances a coin relay circuit to an earth ground. This load then provides the necessary current path back to the telephone central office to indicate that initial coin deposit has been made. In the case of many telephone central offices this same condition can be simulated by grounding the transmitter included in the telephone handset.

SUMMARY OF THE INVENTION

In the present invention, circuitry is provided that permits the paystation instrument to detect when a transmitter has been grounded and in response to the test of said grounding to enable an associated microprocessor or similar logic circuitry to disable an associated calling device (dial or keypad).

The development of the ground detect signal is accomplished by means of a comparator circuit connected across the paystation transmitter. This comparator circuit monitors the current passing through both leads of the telephone transmitter and also monitors the current by means of a voltage divider directly across the transmission network comparing the two voltages by means of an integrated circuit differential amplifier. Under normal conditions the two inputs to the differential amplifier are adjusted so that the voltage at the non-inverting input is slightly higher than that at the inverting input. Should a ground connection be made to either of the leads extending from the transmission network to the transmitter, voltage at the inverting input will increase to a level greater than the level of voltage at the non-inverting input thus causing the output to switch from a high level to a low level. Such change in the output circuit is then monitored by the associated microcomputer or logic circuitry. In response to the detection of such change the associated microcomputer or logic circuitry will then disable the associated dial or keypad thus inhibiting further use of the telephone paystation.

DESCRIPTION OF THE PREFERRED EMBODIMENT

Figure 1:
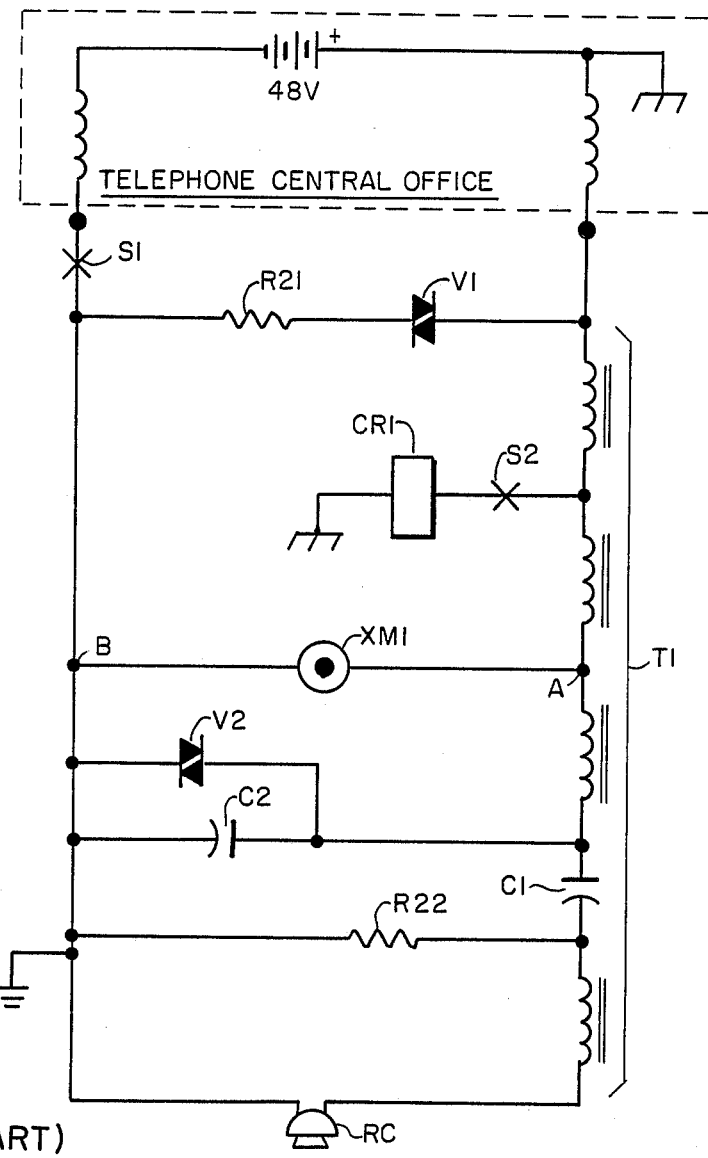
FIG. 1 is a simplified schematic of a paystation transmission network with handset, receiver and transmitter, connected to an associated telephone central office by means of a telephone line as might be found in the prior art.

Referring now to FIG. 1 (a prior art simplified schematic diagram), a portion of a telephone paystation like that known as the Model 120C and manufactured by Palco Telecom Inc. is shown. As indicated, the circuitry includes a paystation transmission network with associated handset, receiver and transmitter connected via a telephone line to a telephone central office where a 48 volt central office battery is connected. As shown in FIG. 1, switch S1 is the paystation loop disconnect switch, while switch S2 is a switch normally controlled by the included paystation electronics to connect the coin relay to the transmission network once the proper quantity of coins (base rate) has been deposited as established by or during a coin test operation. When switch S2 is open and switch S1 is closed no ground current can be detected at the central office battery ground terminal. When switch S2 is closed or when either end of the transmitter is connected to earth ground a current path is then established through the central office earth ground connection. The office then detects this ground current or difference in current through the two loop conductor leads to determine if the initial coin deposit has been established.

Figure 2:
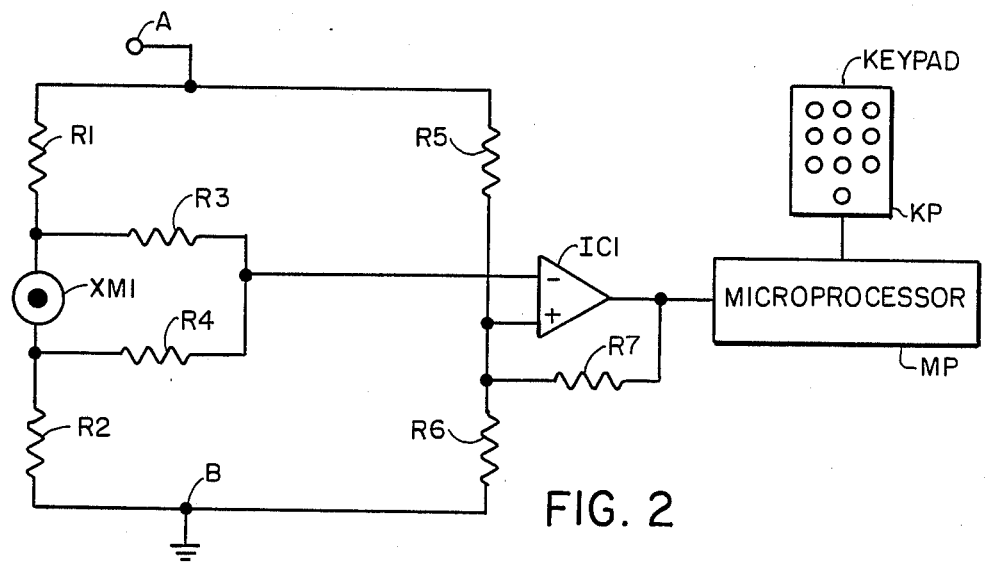
FIG. 2 is a schematic diagram of a comparator circuit useful for detecting the presence of ground at the transmitter in an associated telephone paystation in accordance with the present invention.

In FIG. 2 the ground detect circuitry useful for preventing users from fraudulent use of the telephone paystation by grounding the handset transmitter is shown. In the detection circuitry a comparator circuit consisting of a differential amplifier IC1 is used to monitor the current through both leads of the transmitter. In the embodiment shown resistors R1 and R2 connected in series with transmitter XM1 are low value resistors to minimize any loss of current through the transmitter. Putting a voltage divider around transmitter XM1 are resistors R3 and R4 which are equal in value and are very large in value compared to that of the transmitter resistance. From the center tap between resistors R3 and R4 a connection is established to the inverting or negative input of differential amplifier IC1 which voltage is adjusted by means of the aforementioned resistors R1, R2, R3 and R4 so that the voltage at the inverting input of IC1 is half the voltage across transmitter XM1 to circuit ground. Resistors R5 and R6 form another voltage divider connected across the transmission network between terminals A and B and are selected in value to present a voltage at the non-inverting or positive input slightly higher than that at the inverting input. This particular combination of voltages at the inputs to the integrated circuit differential amplifier IC1 forces the output of integrated circuit IC1 to a high state. Resistor R7 then connected from the output of differential amplifier IC1 to the non-inverting input provides a positive feedback for hysteresis.

When either lead of the transmitter is connected to earth ground the voltage at the inverting input will increase to a level substantially greater than that level at the non-inverting input causing the output of the integrated circuit differential amplifier IC1 to switch from a high level to a low level. This output typically is connected to the station microprocessor or similar other logic circuitry which in turn functions to disable the calling device (dial or keypad). Other features of the telephone paystation can also be controlled by means of this output signal.

Thus it can be seen by monitoring the current through both leads of a carbon transmitter as shown in FIG. 2, it is possible to generate a logic signal when the transmitter is grounded and utilize this signal to disable various paystation instrument functions, thus preventing the user from frauding the telephone company by generating false ground currents which can be detected by the telephone central office as an indication that the initial or required coin deposit has been made. The aforementioned circuitry may be utilized in both the prepay and emergency prepay modes of operation where the instrument contains logic devices which can utilize the ground detect signal for controlling the various telephone instrument functions.

It will be obvious from the foregoing that numerous modifications of the present invention can be made without departing from the spirit of the present invention which should be limited only by the scope of the claims appended hereto.

What is claimed is:

1. A telephone paystation connected to a telephone central office via a telephone line, said paystation including a transmitter including first and second input terminals, a calling device, a microprocessor, a transmission network, an earth ground and a ground detect circuit, said ground detect circuit comprising:
   a comparator circuit including first and second input terminals connected to said first and second transmitter input terminals, respectively, said comparator circuit further including an output terminal connected via said microprocessor to said calling device;
   said comparator circuit operated in response to connection of said earth ground to one of said transmitter terminals to generate an output signal at said comparator output terminal whereby said microprocessor is operated to disable said calling device connected thereto.

2. A ground detect circuit as claimed in claim 1, wherein:
   said comparator circuit comprises a differential amplifier circuit including first and second input terminals and an output terminal;
   a first voltage divider connected in parallel with said transmitter across said transmission network and including a center tap connected to said differential amplifier first input terminal;
   a second voltage divider connected across said transmission network including a center tap connected to said differential amplifier second input.

3. A ground detect circuit as claimed in claim 2, wherein:
   said first voltage divider comprises first and second low value resistors connected in series with said transmitter across said transmission network and third and fourth high value resistors each equal to the other and each being very large in value compared to the resistance of said transmitter;
   said third and fourth resistors connected in series with said first and second resistors and in parallel to said telephone transmitter and including a center tap between said third and fourth resistors connected to the first input of said differential amplifier whereby a voltage is presented to said first input of said differential amplifier that is equal to half the voltage across said transmitter.

4. A ground detect circuit as claimed in claim 2, wherein:
   said second voltage divider comprises first and second resistors connected in series across said transmission network including a center tap between said resistors connected to said second input of said differential amplifier;
   said value of said resistor selected to present a voltage at the second input of said differential amplifier slightly higher than that present at the first input of said differential amplifier.

5. A ground detect circuit as claimed in claim 2, wherein:
   further included is an additional resistor connected between said differential amplifier output and said differential amplifier second input;
   said resistor providing positive feedback.

* * * * *